Sept. 1, 1931.  E. O. COREY  1,821,422
GAUGE COCK
Filed Aug. 9, 1928

Inventor
Elmer O. Corey
By Ward & Ward
Attorneys

Patented Sept. 1, 1931

1,821,422

UNITED STATES PATENT OFFICE

ELMER O. COREY, OF NORWOOD, OHIO, ASSIGNOR TO THE EDNA BRASS MANUFACTURING COMPANY, OF CINCINNATI, OHIO, A CORPORATION OF OHIO

GAUGE COCK

Application filed August 9, 1928. Serial No. 298,595.

This invention relates generally to improvements in valve construction, and particularly to a class of valve commonly referred to as a gauge cock used in connection with steam boilers, and wherein the seat may be renewed or repaired while the boiler is under steam.

The cock structurally is of a type as shown and described in Letters Patent No. 1,632,403 to J. G. Grantland, June 14, 1927, in which the valve is threaded within the body to engage in one direction against a permanent seat formed in the body and when adjustably moved in a reverse direction against a renewable seat, the renewable seat being disposed between the body and bonnet, the body and bonnet being clamped together by a union nut so that the renewable seat is accessible when removing the bonnet, and the valve control maintained or closed by engaging the valve against the permanent seat within the body.

The present invention is directed to the end structure of the body and bonnet providing for inter-engagement of the parts when clamped together to make a self-sealing joint and relieve the renewable seat of any clamping or compression strains as in the case where the seat serves as a packing between the bonnet and body which tends to distort the packing, destroying its utility and service as a seat for the valve. The renewable seat is wholly within the end of the bonnet, bears against a removable base or washer, is easily dislodged for renewal, and is only subjected to the closing valve pressure, thereby furnishing a more effective valve seat, offering extended service.

It is, therefore, an object of the invention to provide a gauge cock with a renewable valve seat interposed between the valve body and removable bonnet, free from bonnet and body coupling strains, and a valve structure in which the body and bonnet have a sealing joint engagement producing definite coupling limits, resulting in a more efficient and simplified valve structure and of increased stability and extended service.

Further objects and advantages will be more fully set forth in a description of the accompanying drawings forming a part of this specification, in which.

Figure 1:
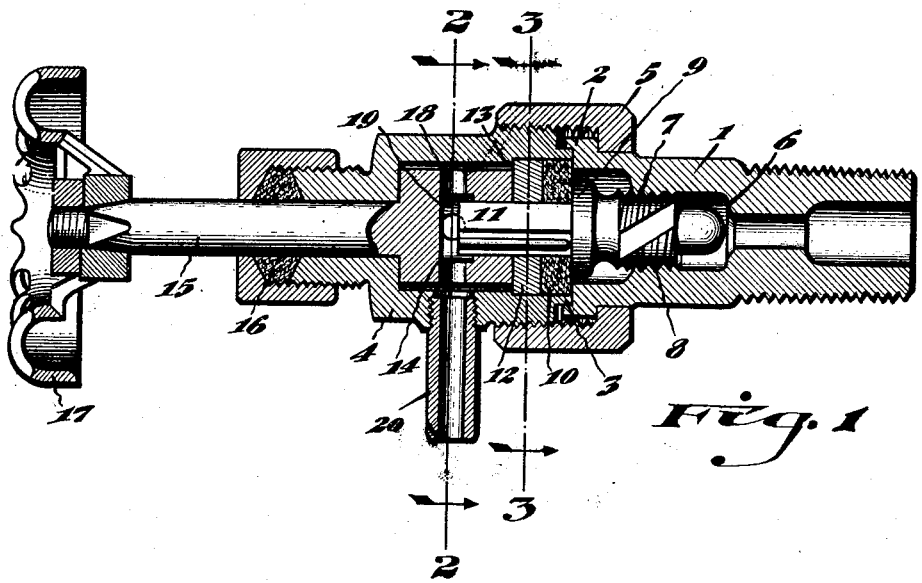
Figure 1 is a central section through the valve containing the improvement.
Figure 2:
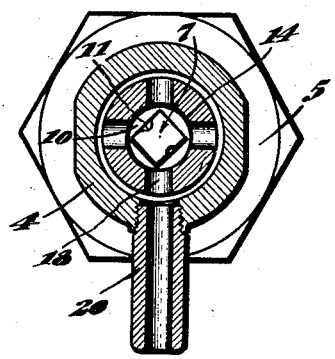
Figure 2 is a section on line 2—2, Figure 1.
Figure 3:
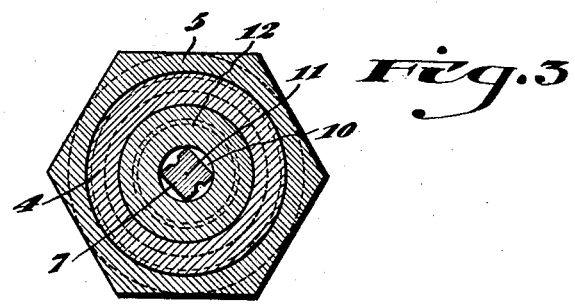
Figure 3 is a section on line 3—3, Figure 1.

Referring to the drawings, 1 indicates a valve body externally threaded at one end for connection with a boiler or other container, and at its opposite end has a collar or annular flange 2 with its face side recessed to receive an annular part 3 extending from the forward end of a bonnet 4. The base of the recess forms an abutment for the annular part 3 of the bonnet to effect a sealing joint within the body and bonnet when coupled together by a union nut 5 engaged over the collar 2 of the body and screw-threaded upon the bonnet.

The body is counterbored and provided with a permanent valve seat 6 for the forward end of the valve 7 screw-threaded within the body, the valve having a screw-threaded shank portion 8 engaging with corresponding internal threads in the valve body intermediate the permanent valve seat and the flanged end of the body. The valve 7 has a head portion providing a disk valve 9 engaging a renewable seat 10, preferably of composition material, received within the forward end of the bonnet 4.

The valve is also provided with a fluted or longitudinally grooved square stem 11 projecting centrally through the valve seat and through a washer 12 seated within the bonnet, the washer providing a base for the rewenable seat 10 and bears against an annular shoulder 13 formed in the valve bonnet. The stem 11 of the valve is slidably engaged in a socket 14 formed on the end of the stem 15 projecting through a stuffing box 16 of the bonnet, the stem carrying a wheel handle 17 for manually rotating the stem and its socket for controlling or regulating the valve.

The socket 14 normally is confined against longitudinal axial movement and is preferably of smaller diameter than the bore in the bonnet within which it lies, to provide an annular space communicating through radial ports 18 in the socket with a central chamber 19. The chamber 19, when the valve is open, communicates with the valve chamber within the valve body through the longitudinal grooves in the valve stem. The screw-threaded or shank portion of the valve is likewise grooved for providing a passage between the valve and the wall of the valve chamber in the body.

The spacing about the socket 14 connects with a nipple 20 tapped into the side of the bonnet. For renewing the seat 10, the valve is adjusted to bring the same in engagement with the permanent seat 6, closing against the flow of fluid through the valve, which action withdraws the disk valve 9 from the seat 10. The union nut is then loosened or unscrewed from the bonnet, releasing the bonnet, and exposing the renewable seat.

The stem socket 14 being withdrawn from the stem 11 permits the bonnet to be removed entirely from the body, and the valve stem 15 with its socket may be moved longitudinally or axially and utilized for thrusting the washer and renewable seat outwardly to dislodge the same from its position within the bonnet and a new seat inserted.

With the valve bonnet and body having direct metal to metal contact when coupled together, relieves the seat of any coupling strains, so that its face surface is not distorted or interfered with for the reception of the disk valve. The regulation of the disk valve alone applies the seating pressure against the seat which is completely confined within the bonnet so that it cannot be squashed out of shape, so that the opportunities for leaks are greatly reduced and the life of the renewable seat materially prolonged.

Having described my invention, I claim:

In a valve of the class described, a valve body, a valve bonnet having a recessed engagement with the head end of the body, forming a metal sealing joint when said members are coupled together, means for coupling said body and bonnet, a removable valve seat fitting within the forward end of the bonnet and adapted to lie adjacent the head end of the body, a valve screw-threaded within the body adapted at one end to engage with a permanent valve seat within the body and at its opposite end provided with a disk for engagement with said removable seat and a valve stem rotatable within the bonnet and having a socketed non-rotatable engagement with a stem on said valve.

In witness whereof, I hereunto subscribe my name.

ELMER O. COREY.